Figures 6, 7:
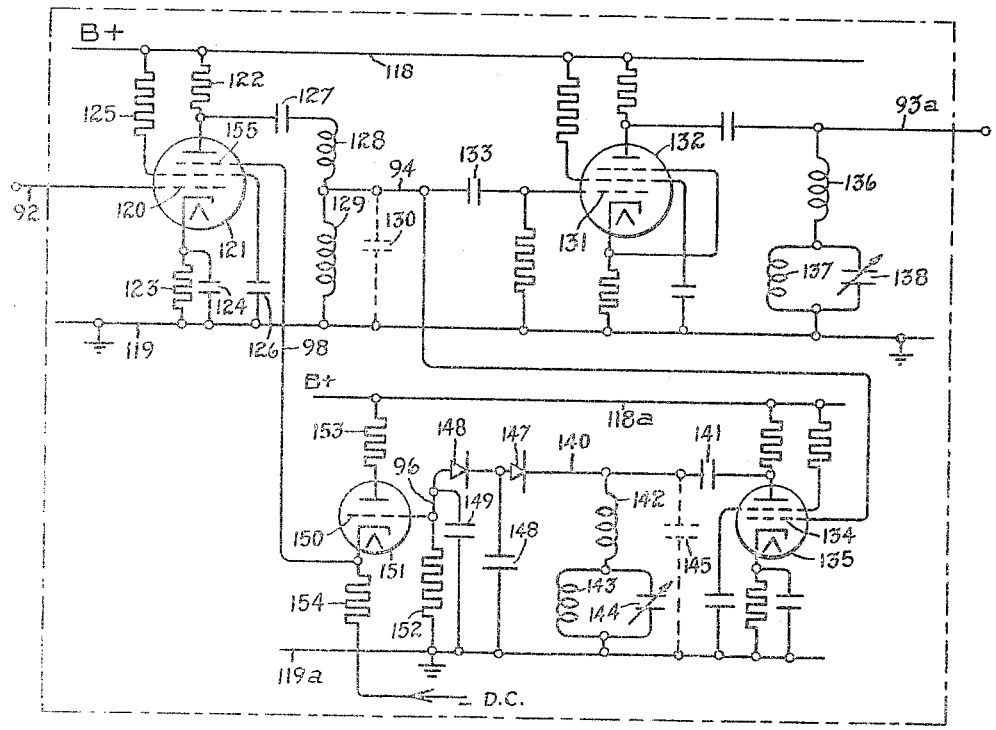

May 2, 1967 W. HAUSZ 3,317,910
MONOPULSE RADAR APPARATUS
Filed Oct. 16, 1951 5 Sheets-Sheet 1
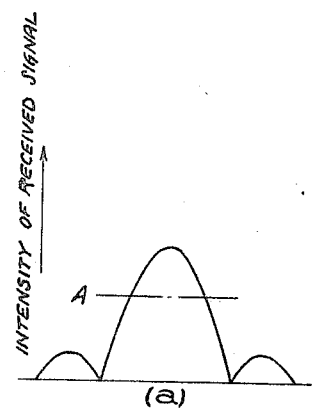
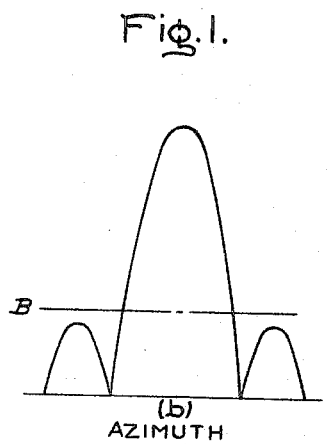
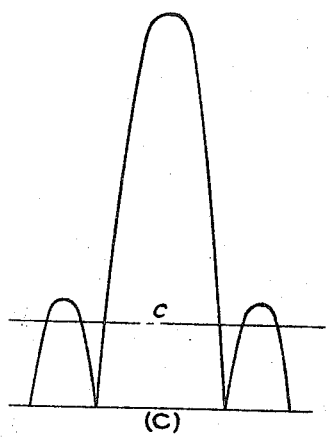
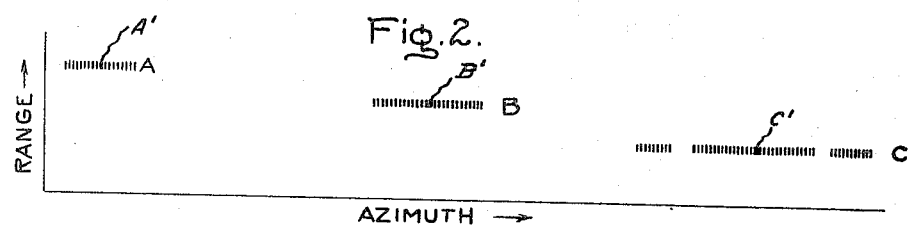
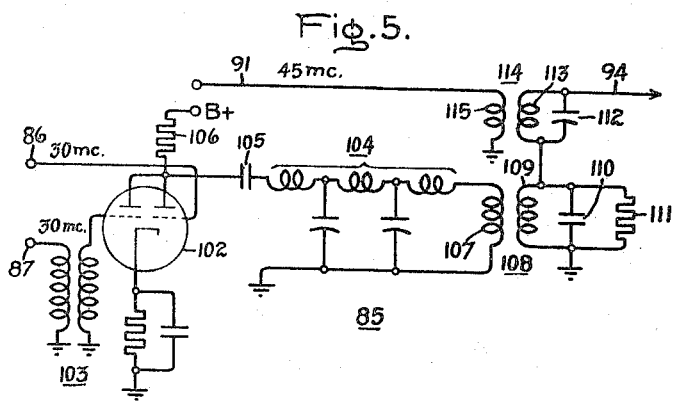
Inventor:
Walter Hausz,
by Merton D Morse
His Attorney.

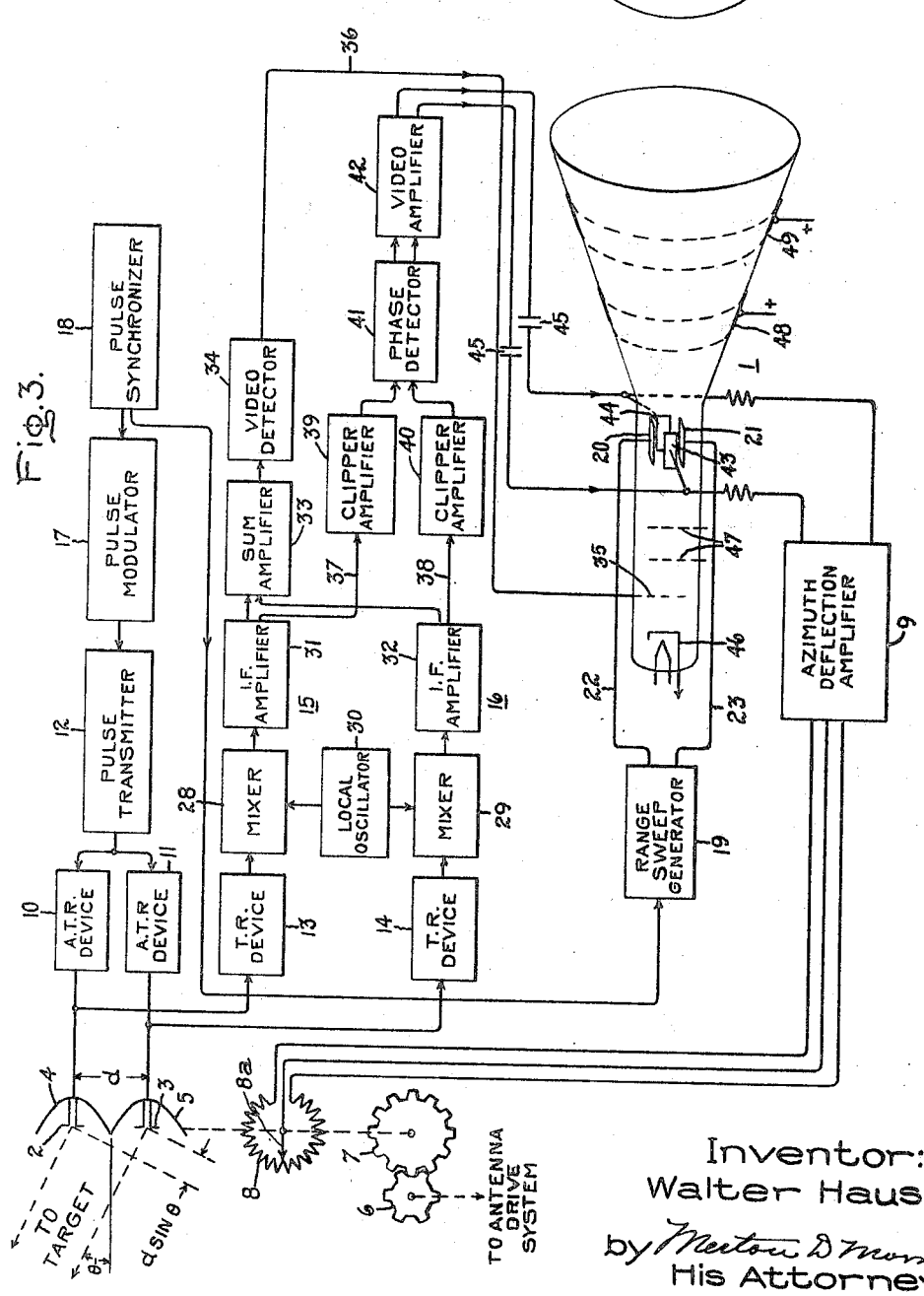

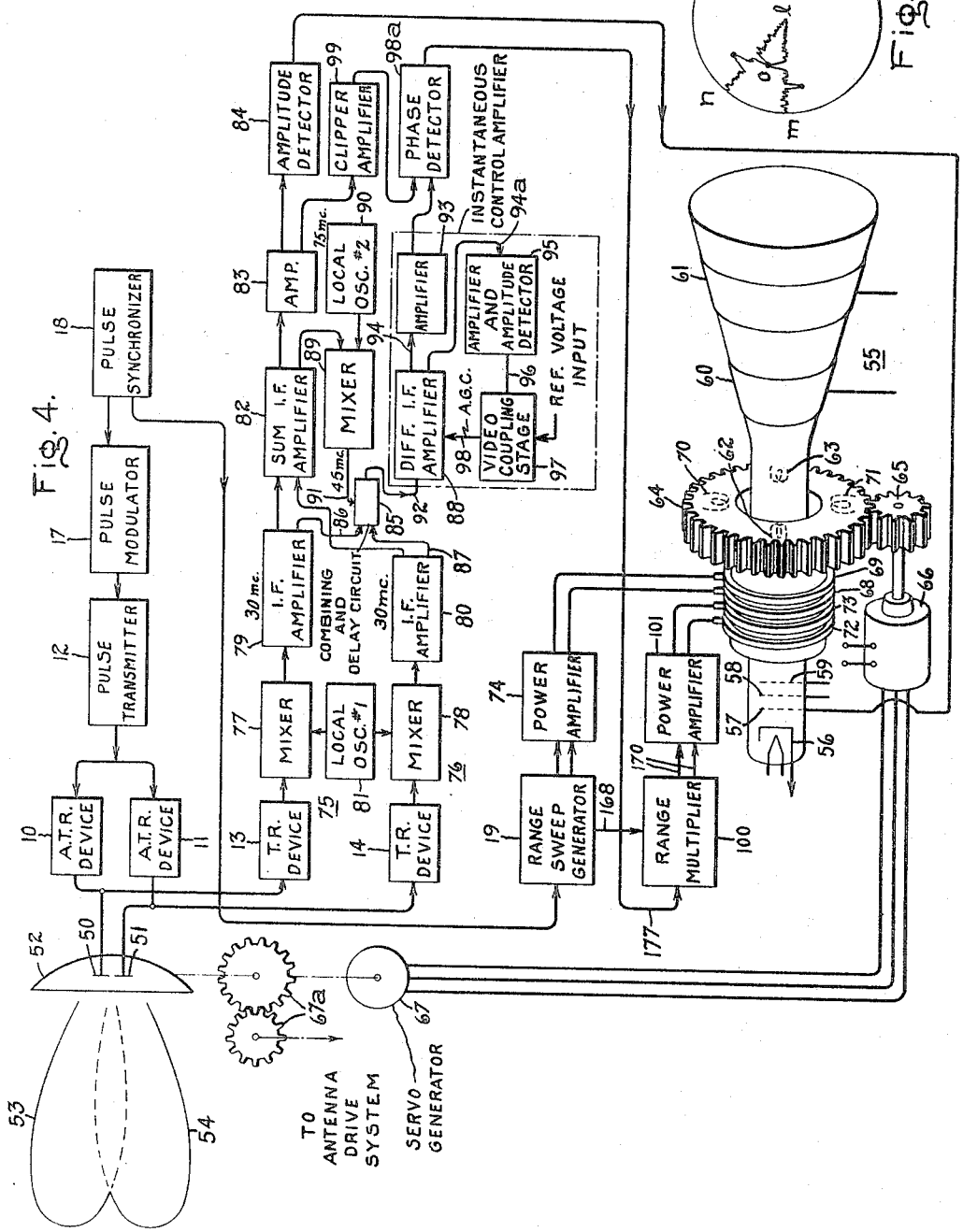

May 2, 1967  W. HAUSZ  3,317,910
MONOPULSE RADAR APPARATUS
Filed Oct. 16, 1951  5 Sheets-Sheet 4

Inventor:
Walter Hausz,
by Merton D. Moore
His Attorney.

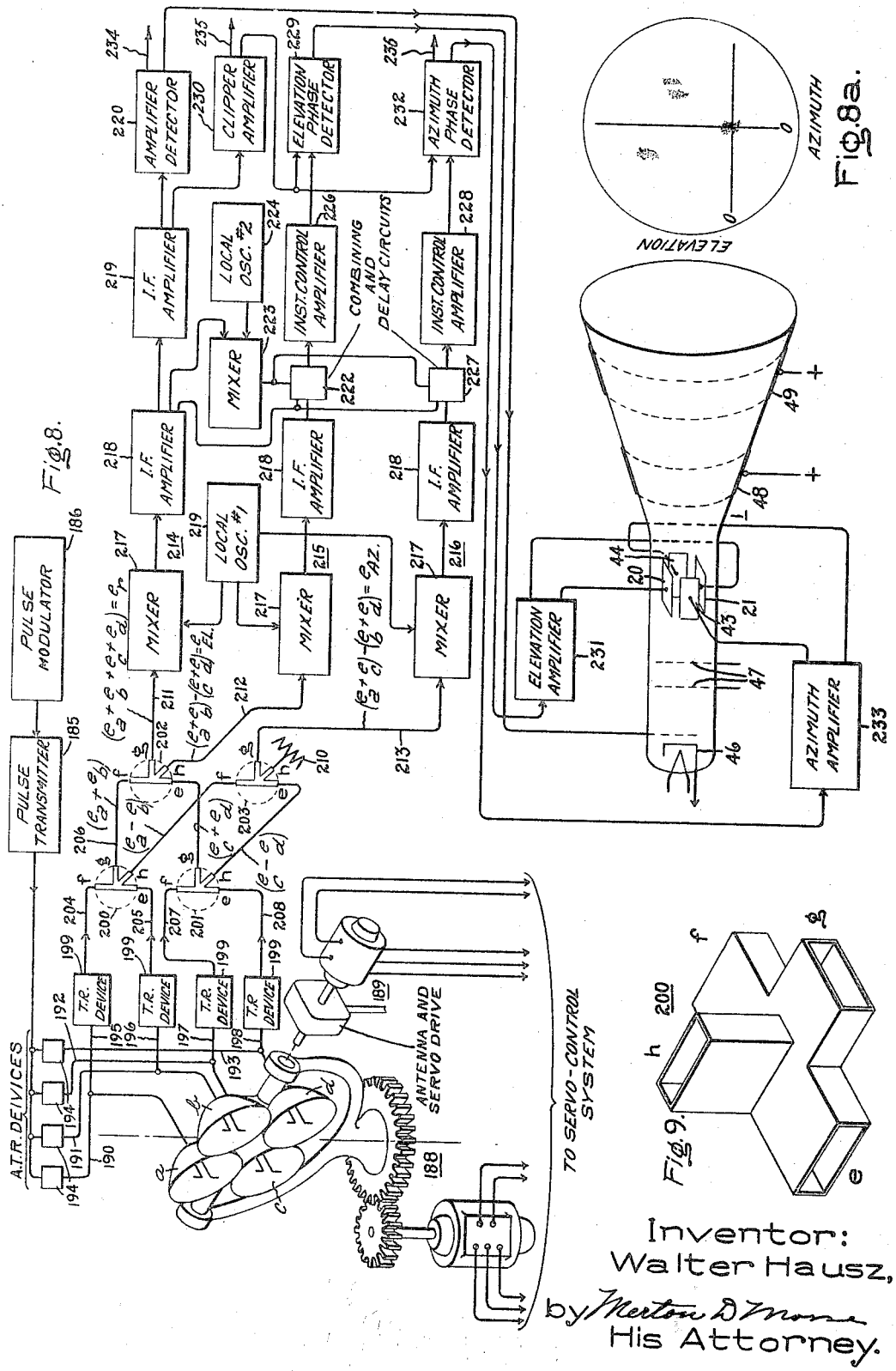

United States Patent Office 3,317,910
Patented May 2, 1967

3,317,910
MONOPULSE RADAR APPARATUS
Walter Hausz, Syracuse, N.Y., assignor, by mesne assignments, to the United States of America as represented by the Secretary of the Air Force
Filed Oct. 16, 1951, Ser. No. 251,582
23 Claims. (Cl. 343—113)

My invention relates to improved radar systems, particularly of the monopulse type, for determining and indicating the position of remote reflecting objects.

Monopulse or simultaneous type radar systems are distinguished from sequential type systems by the derivation of the positional information from each reflected pulse rather than from a succession of reflected pulses. In one type of monopulse system, a pair of antennas are spaced apart in a plane so that the relative phase relationship of the reflected waves received by these antennas is utilized to provide the positional information for one coordinate. Such a system is termed a phase comparison system and an example of a prior art system of this type is disclosed and claimed in Blewett Patent 2,467,361, dated Apr. 12, 1949 and assigned to the assignee of the present invention.

Another known form of simultaneous, or monopulse, system is the so-called amplitude comparison system. This again utilizes a pair of antennas and receiver channels for each coordinate but has the antennas effectively located at a common point with their directive axes diverging from the common axis of the array. As is well-known to those skilled in the art, one coordinate of the target may be determined from a comparison of the relative amplitudes of the signals received by the antennas of each pair.

My invention relates to improvements in radar systems, particularly of the above types and has for an important object the provision of a monopulse radar system which provides better resolution between multiple targets or sharper definition of a single target. As will be readily appreciated by those skilled in the art, a reflected signal indicating a "hit" is received over a substantial angle on either side of the directive axis of the radiated beam. This is due to the width of the beam or wavefront at the range of the particular target. Attempts have been made to sharpen the display by narrowing the beam. However, there are definite limitations on narrowing the beam or actual beam sharpening and in general to narrow the beam below the limits already commonly used requires larger antennas or higher frequencies with the accompanying disadvantages with respect to the equipment required and also with respect to attenuation of the received signals due to atmospheric absorption and scattering. This approach also narrows the field of coverage by the beam. From the above, it is apparent that actual beam sharpening offers one approach to better resolution in systems of the character involved in my invention but there are rather serious limitations which determine the minimum beam width for a commercially practicable system.

In accordance with an important aspect of my invention a quantitative video error signal proportional to the deviation of the target from the beam or antenna axis and independent of the range and target size is derived and introduced into the system as a correction voltage such as a deflection correction voltage or to furnish additional positional information over and above the location of a primary reflecting object. In a preferred embodiment of my invention, the error signal is applied as a deflection correction voltage to the corresponding deflection system of the display tube with the result that the display appears on the screen at a single place, i.e., at a point corresponding to the true location of the target, throughout the time that reflected pulses are received. In other words, the error voltage is sufficient to apply a correction to the deflection system corresponding quantitatively to the deviation between the axis of the beam and the target.

In its broader aspects, the invention involves the use of multiple antennas to obtain additional information regarding the target, as compared to conventional systems, and this information is in the form of electrical signals which are suitably processed and applied to improve the quality of the display or to provide additional positional information.

The system is applicable to all types of monopulse systems including both phase comparison and amplitude comparison types of radar systems and has other advantages than improved resolution. For example, there is a marked improvement in the brightness of the display resulting from the localization of the electron beam of the display tube on a spot corresponding to the position of the target on the beam axis. This increases the effective signal strength as compared with random noise and gives a display of a quality equal to that of a system having a higher signal to noise ratio.

The objects and advantages which characterize my invention will become more apparent as the following description proceeds, reference being had to the accompanying drawings and its scope will be pointed out in the appended claims. In the drawing, FIG. 1 illustrates the intensity of received energy in a radar antenna as a function of azimuth for three targets, weak, medium and strong (A, B, and C respectively). FIG. 2 illustrates the character of display obtained on a conventional range versus azimuth display for targets A, B and C, FIG. 3 illustrates an embodiment of my invention applied to a phase comparison system and providing a range versus azimuth display as shown in FIG. 3a, FIG. 4 illustrates a modification of my invention applied to an amplitude comparison system and providing a polar coordinate or PPI display as shown in FIG. 4a. FIGS. 5, 6 and 7 illustrate respectively circuit details of certain of the components of the system illustrated in FIG. 4. FIG. 8 illustrates a phase comparison system embodying my invention and providing an elevation versus azimuth display as shown in FIG. 8a and FIG. 9 is an enlarged view of a component of the system of FIG. 8.

Referring now to the drawing and particularly to FIGS. 1 and 2 the display obtained in conventional radar systems will be discussed particularly with respect to lack of adequate resolution or definition.

In FIGS. 1(a), 1(b) and 1(c) there is shown the distribution of the received wave energy for three different targets, A, B and C respectively. In FIG. 2, the display appearing on a type B oscilloscope, that is, a range versus azimuth oscilloscope is shown for targets A, B and C. It is readily apparent that the target occupies only a single position corresponding to the center of each of the displays shown at A, B and C of FIG. 2 that is at the bright spots (heavy lines), A', B' and C'. There are, due to the width of the beam or wavefront at the target, a series of displays or hits on either side of the actual target position. Particularly for strong targets such as C the received energy exceeds the cut off level (shown in FIG. 1) of the oscilloscope used for the display of FIG. 2 over a wide range of azimuths including several "side lobes." As will become apparent as the description proceeds the present invention provides a system for showing the hits only at a position corresponding to the bright spots of FIG. 2 or in other words, the display is the same as would be produced with a beam of negligible width.

Referring now to FIG. 3 of the drawing, I have shown my invention embodied in a radar system for providing a range versus azimuth display on the face of a cathode ray tube 1. The system includes a pair of antennas or feeds 2 and 3 spaced apart by a distance $d$ and provided respectively with parabolic reflectors 4 and 5. The distance $d$ is suitably chosen, it being understood the difference in phase betewen the signals received by the two antennas for a target off the axis of the antenna increases as $d$ increases. In other words, the sensitivity increases with $d$. Increased $d$, however, requires a larger antenna structure so that $d$ will usually have a value equal to a number of wavelengths at the operating frequency. The feeds are, in accordance with the teachings of the prior art, highly directive and are mounted to be moved angularly in azimuth by a suitable mechanical drive system including drive gears 6 and 7. The movable element 8a of a potentiometer device 8 is coupled directly to the antenna drive shaft to produce a voltage corresponding to the azimuth position of the antennas. The end points of the stationary winding and movable contact are connected to the azimuth deflection amplifier 9 and the potentiometer and the amplifier are adjusted to produce an amplifier output which when applied to the horizontal deflection plates produces a horizontal deflection in accordance with the azimuth position of the antennas.

For a symmetrical antenna assembly, as shown, it is apparent that the axis of symmetry or directive axis of the antenna assembly is the same as the locus of target positions for which the same signal is received by both antennas. This will be referred to as the equisignal axis of the antenna assembly and since the system shown in FIG. 3 is a phase comparison system it may also be referred to as an equiphase axis.

The radiated pulse voltages from which the echo voltages are derived may, of course, be supplied from a separate transmitter antenna system. However, as shown in FIG. 3 the same antennas 2 and 3 are used for both transmitting and receiving by the use of suitably connected A.T.R. (anti-transmit-receive) devices 10 and 11 connected in the wave guide connections between a pulse transmitter 12 and the antennas 2 and 3 and a pair of T.R. (transmit-receive) devices 13 and 14 connected respectively in the wave guide circuits between two receiving channels 15 and 16 and the antennas 2 and 3. The construction, operation and method of connecting these devices for the purpose of utilizing a common antenna structure for both transmitting and receiving are well known in the art and need not be described here. For detailed information, reference may be had, for example, to Chapter XI of "Principles of Radar," M.I.T. Radar School Staff (McGraw-Hill, 1946).

The transmitter also includes a pulse modulator illustrated diagrammatically at 17 for determining the repetition rate of the radio frequency pulses transmitted and a pulse synchronizer circuit illustrated at 18 which is coupled to a pulse modulator 17 and also to a range sweep generator illustrated at 19. As will be readily understood, the synchronizing circuit is for the purpose of establishing a timed relation between the transmitted pulses and the range sweep voltage so that the display obtained on the faces of the cathode ray device will have a vertical displacement dependent upon the time at which the reflected or echo pulse is received. This is, of course, an indication of the target range. The range sweep generator may be of any types well-known in the art for producing a periodic sawtooth voltage which is impressed on the range or vertical deflection plates 20 and 21 by conductors 22 and 23.

The two receiver channels 15 and 16 are identical as far as the high and intermediate frequency portions are concerned and as previously mentioned are connected respectively with antennas 2 and 3. These circuits receive the reflected pulses of the frequency of the transmitter and these are heterodyned respectively in mixer circuits 28 and 29 with the oscillations produced by a local oscillator 30 common to the mixer circuits 28 and 29 of both receiver channels. The intermediate frequency output of the mixers 28 and 29 is amplified by intermediate frequency amplifier circuits 31 and 32 respectively. As will be described in more detail at a later point in the specification it is necessary to preserve the phase relation between the reflected pulses received by antennas 2 and 3 and the use of a single local oscillator as well as the selection of amplifiers 31 and 32 are governed by this consideration.

The output of the intermediate frequency amplifiers 31 and 32 of the two channels 15 and 16 are combined and supplied to a sum amplifier designated generally by the numeral 33 to provide an output voltage dependent upon the vector sum of the voltages of amplifiers 31 and 32. This voltage is supplied to a video detector circuit designated by the numeral 34, and the output thereof connected to the control grid 35 of the cathode ray tube 1 through conductor 36 for the purpose of controlling the voltage of the control grid and thereby the intensity of the display in accordance with the sum of the reflected voltages. This voltage is of a polarity to increase conduction of the device as the voltage increases so that the intensity of the display increases with the strength of the sum of the reflected signals. It is apparent then that the intensity of the display is influenced, not only by the range but also by the target size.

In accordance with an important aspect of the present invention, a video signal having a magnitude quantitatively dependent upon the relative phase of the voltage received by the antennas 2 and 3 is provided and this voltage supplied to the azimuth deflection circuit. As shown in the drawing, the output of intermediate frequency amplifiers 31 and 32 of the two channels 15 and 16 are connected respectively by conductors 37 and 38 with clipper amplifier circuits 39 and 40. The clipper amplifier circuits are for the purpse of further amplifying the outputs of amplifier 31 and 32 and also for obtaining a voltage which is independent of the magnitude of the voltage produced by the intermediate frequency amplifiers 31 and 32. In other words, the outputs of clipper amplifiers 39 and 40 differ in phase by the same angle as the pulses received by antennas 2 and 3 and supplied to the receiver channels and are independent of the magnitude of these pulses (i.e. independent of range and target size). These clipped voltages are supplied to a phase detector circuit 41 to obtain a voltage having a magnitude and polarity dependent upon the relative phase relation between the voltages of the antenna feeds 2 and 3 resulting from a reflected signal. This phase detector or phase comparator may be of a well-know prior art type and may for example be of the type shown in the aforementioned Blewett Patent No. 2,467,361 or of the type described and claimed in copending Zachary et al. application Ser. No. 156,298, filed Apr. 18, 1950, now Patent No. 2,734,168, and assigned to the assignee of the present invention. The output of the phase detector is supplied to a video amplifier 42 and the output of this amplifier is coupled to the horizontal or azimuth deflection plates 43 and 44 of the cathode ray tube 1 by means of suitable coupling capacitors 45.

In addition to the elements of the cathode ray tube 1 which have already been described, it will be apparent that it includes a source of electrons or cathode illustrated at 46, accelerating grids 47, accelerating anode 48 and a final anode 49.

A better understanding of the features and advantages of the embodiment of my invention described in connection with FIG. 3 will become apparent from a consideration of the operation of that system. Energy returned from a target in the field of the antennas 2 and 3 in the form of reflected pulses will excite both antennas. For the usual and illustrated case where the antennas have equal areas and identical directional patterns, the voltages developed in them will be equal in magnitude but will differ in phase for any target not on the axis of symmetry or equisignal axis. For a target at an angle $\theta$ with respect to the axis of symmetry of the two antennas the phase angle α between received voltages to equal to $$\frac{2\pi d}{\lambda}(\sin \theta)$$

where $d$ is the distance between center lines of the antennas and $\lambda$ is the radio frequency wavelength. For small values of $\theta$, $\sin \theta$ approximates $\theta$, and the phase angle α is essentially linearly related to $\theta$. Accordingly, the phase angle α between the received voltages, if preserved, may be used to produce a desired correction deflection voltage. In the embodiment illustrated in FIG. 3, this angle is preserved and used to provide a correction voltage which is introduced into the azimuth deflection system to show any target in the fields of the antennas 2 and 3 at a position corresponding to the true azimuth of the target.

Referring now to FIG. 3, the radio frequency voltages received by antennas 2 and 3 are fed through suitable high frequency connections to the mixer circuits 28 and 29 where they are heterodyned with the output of a local oscillator 30 to provide suitable intermediate frequencies, for example 30 megacycles, which are in turn supplied respectively to phase stable intermediate frequency amplifiers 31 and 32. Amplifiers which are phase stable are readily available and tests carried out indicated that the phase error between the two amplifiers may be kept below ±5 degrees without difficulty.

The correction deflection voltage is obtained by phase detector 41, but since phase detectors are as a general rule also sensitive to amplitude changes the output of the intermediate amplifiers 31 and 32 should be limited or clipped to provide a voltage which is independent of range and target size. This, however, is not done with the outputs of the intermediate frequency amplifiers which are supplied to the sum amplifier for the purpose of supplying the sum voltage to the control electrode of the electric discharge device 1 to provide a display varying in brightness in accordance with the vector sum of the received voltages. The phase relation should also be maintained in the clipper amplifier circuits 39 and 40 so that the voltages applied to the input of the phase detector 41 have a phase difference corresponding to phase difference between the voltages received by antennas 2 and 3. The output of the phase detector which varies in magnitude of the difference in phase angle and in polarity with the algebraic sign of the phase difference between the received pulses is amplified and supplied to the horizontal deflection plates 43 and 44. Since this signal is linearly related to the angle between the direction of the target and the axis of symmetry of the antenna, which also corresponds to the azimuth position on the display resulting from the output of the azimuth deflection amplifier, it is apparent that this voltage will produce a correction deflection in the azimuth control sufficient to show the target at its true azimuth position for the entire time that the target is within the field of the antenna. In other words, the signal reduces to zero as the angle between the target direction and antenna axis or equisignal axis reduces to zero and reverses in polarity as the angle changes from one side of the axis to the other. It is apparent that showing each target only at its true position results in much better definition and better resolution between multiple targets.

In the foregoing description, my invention has been described in connection with a system for displaying a single coordinate of a target by phase comparison of the reflected signals. The invention is not limited either to an improved display of a single coordinate or to phase comparison systems and in FIG. 4, I have shown another embodiment of my invention involving an amplitude comparison system.

Referring now to FIG. 4 of the drawing, I have shown my invention applied to an amplitude comparison system including a pair of antennas or feeds 50 and 51 supported in a single reflector 52 mounted for rotation in azimuth. As indicated the intersecting lobes 53 and 54 are squinted or directed at a slight angle with respect to one another by lateral displacement of 50 and 51 from the focus of 52, as is well known in the art, so that the radiated wavefronts are of equal amplitude on the directive axis of the antenna assembly with the amplitude of one wave larger on one side of that axis and smaller on the other side of the axis and vice versa for the other antenna feed. The system of FIG. 4 is illustrated as providing a range versus azimuth display on polar coordinates. This type of display is generally referred to as a PPI display.

In accordance with usual practice, the display (FIG. 4a) is provided on the face of a cathode ray tube 55 having a cathode 56, a control grid 57, accelerating grids or anodes 58 and 59 and further accelerating electrodes 60 and 61. The beam of the device 55 is deflected electromagnetically in a radial direction by means of coils illustrated schematically at 62 and 63. As illustrated, the coils are mounted on a yoke 64 which is rotated in correspondence with the azimuth position of the antenna assembly by means of gearing 65 and angular motion transmitting means including a servo motor 66 connected thereto and a servo generator 67 coupled to the antenna drive 67a. As illustrated, the deflection currents are supplied to coils 62 and 63 through slip rings 68 and 69.

In addition to coils 62 and 63, coils 70 and 71 are also mounted on the yoke 64 and are oriented to produce an axial magnetic field which, as will be readily understood, produce deflections of the beam in a tangential or circumferential direction. Coils 70 and 71 are energized through slip rings 72 and 73.

In accordance with usual practice for radar systems providing a PPI display, the control grid 57 is energized by voltage dependent upon the sum of the amplitudes of the pulses received on antennas 50 and 51 to control the spot brightness in accordance with the range and size of the reflecting target. The coils 62 and 63 correspond to those normally used for the radial or range deflection and they are energized by a sawtooth current wave synchronized with the transmitter. In addition to these usual controls and in accordance with an important aspect of the present invention, the coils 70 and 71 are provided and energized by a voltage quantitatively independent of target size and proportional to the product of the range and the deviation (in azimuth for the particular system illustrated) of the target from the axis of symmetry of the squinted beams 53 and 54.

The transmitter may be the same as described in connection with FIG. 3 and the same components have been designated by the same reference numerals. Likewise, a range sweep generator 19 is provided and synchronized with the transmitter so that the sawtooth wave generator has a predetermined timed relation to the transmitted pulses. Inasmuch as electromagnetic deflection is utilized, the output of the range sweep generator 19 is amplified by a suitable power amplifier 74, the output of which is impressed on the slip rings 68 and 69.

The receiver includes two channels 75 and 76 which at the high frequency end are identical and as illustrated, include TR devices 13 and 14, mixers 77 and 78, and intermediate frequency amplifiers 79 and 80. The mixer circuits are supplied from a common local oscillator 81. Inasmuch as the system of FIG. 4 is an amplitude comparison system, the intermediate frequency amplifiers 79 and 80 are designed with particular reference to amplitude stability rather than phase stability as was required in connection with the amplifiers 31 and 32 of FIG. 3.

The voltage for energizing the control electrode 57 is obtained from an intermediate frequency sum amplifier designated by the numeral 82 which is energized by outputs from both the intermediate frequency amplifiers 79 and 80. The amplitudes are added algebraically and the sum voltage is amplified by an additional amplifier 83. The output of amplifier 83 is supplied to an amplitude detector 84 to provide a sum voltage at video frequency.

As previously pointed out, the present invention involves the energization of the deflecting coils 70 and 71 with a video error voltage which varies in accordance with the deviation of a reflecting target from the equisignal axis of the antenna beams (azimuth position of the antenna) and is independent of target size. It is apparent that the difference between the amplitudes of the 30 megacycle voltage output of intermediate frequency amplifiers 79 and 80 is a measure of the deviation of the target from the eqisignal or equiamplitude axis of the antennas 50 and 51. In FIG. 4, I have shown schematically circuits for obtaining this difference and rendering it independent of target size and range.

The difference between the amplitudes is obtained by feeding the outputs of intermediate frequency amplifiers 79 and 80 to a combining and delay circuit designated by the numeral 85 through conductors 86 and 87. This voltage is delayed for a purpose that will be described more in detail at a later point in the specification and is combined with a 45 megacycle control voltage obtained from the 30 megacycle sum amplifier 82. It is apparent that the 45 megacycle voltage will vary in magnitude in accordance with range and target size in the same manner as the 30 megacycle difference voltage, and this variation is used to control the gain of a difference intermediate frequency amplifier 88 inversely with respect to the magnitude of the 45 megacycle signal.

The 45 megacycle control voltage is obtained by means of a mixer circuit 89 energized by an output from the sum amplifier 82 and a 75 megacycle local oscillator circuit 90 and impressed on the combining circuit 85 through conductor 91. Both the 45 and 30 megacycle outputs of the combining circuit are impressed on the difference amplifier 88 by conductor 92. The output of amplifier 88 is supplied to a second amplifier 93 through conductor 94 and through conductor 94a to an amplifier and amplitude detector circuit 95. Amplifiers 93 and 95 respectively provide amplified 30 and 45 megacycle outputs. The 45 megacycle output of amplifier and amplitude detector 95 is supplied through conductor 96 to a video coupling stage 97 to produce a voltage which increases negatively as the magnitude of the detected output of circuit 95 increases. This control voltage is fed back to the difference amplifier 88 through conductor 98 to reduce the gain of that amplifier as the 45 megacycle output increases and, in this way, to tend to maintain the output independent of variations in the amplitude of the sum signal.

As will become more apparent from a consideration of the detailed description of the circuit components 88, 93, 95 and 97 which is given at a later point in the specification, these components constitute an automatic gain control amplifier which functions to render the output of amplifier 93 independent of range and target size. This output is converted to a video error voltage which varies in accordance with this output and reverses in sign when the difference voltage reverses in sign, that is, when the target moves from one side of the axis of the antenna system to the other. This conversion is accomplished by a phase detector 98a.

The phase detector 98a may be of any of the types well known in the art, and, to advantage, may be of the type described and claimed in copending Zachary et al. application Ser. No. 156,298, filed Apr. 18, 1950, and assigned to the assignee of this application. The phase detector is also supplied with a reference voltage obtained from the amplifier 83 of the sum channel through a clipper amplifier 99. Since phase detectors are normally amplitude sensitive, the clipper amplifier 99 is employed to render the reference voltage of substantially constant magnitude.

In the particular embodiment illustrated, the output of the phase detector is employed to give an azimuth correction deflection on a PPI type of display and, since the magnitude of the correction deflection required for a given angular error is proportional to range, it is necessary to multiply the error voltage by a range multiplier which has been designated by the numeral 100 and which will be described in detail in connection with FIG. 7. The circuit 100 increases the magnitude of the error voltage in direct proportion to range, and the output of this circuit is amplified by a power amplifier 101 and impressed on the slip rings 72 and 73 which, as previously indicated, are connected to the deflecting coils 70 and 71.

Referring now to FIG. 5, I have shown in detail the components of a suitable combining and delay circuit 85. The circuit includes an electric discharge device 102 which may, to advantage, be a twin triode having the control members energized respectively from the output conductors 86 and 87 of the intermediate frequency amplifiers 79 and 80. Since discharge device 102 is utilized to obtain a difference voltage, the intermediate frequency voltage from amplifier 80 is impressed on the control member through a transformer 103 which reverses its phase with respect to the voltage of intermediate frequency amplifier 79. The output of the device 102 is impressed on a T-type filter circuit 104 including one or more delay sections through a coupling or isolating capacitor 105 connected to the junction between the plates of device 102 and a plate resistor 106. The delay network is terminated by the primary winding 107 of an output transformer 108, the secondary 109 of which is tuned by means of capacitor 110 to 30 megacycles. This resonant circuit may be paralleled by a suitable resistor 111 for matching the delay networks 104. The resonant circuit including winding 109 and capacitor 110 is connected in series between ground and the output conductor 94 through a parallel circuit resonant at 45 megacycles and including a capacitor 112 and the secondary winding 113 of a transformer 114 having a primary winding 115 energized by the 45-megacycle control voltage impressed thereon by conductor 91.

In FIG. 6, I have shown in detail the circuits of components 88, 93, 95 and 97 of the instantaneous control gain amplifier of FIG. 4. These circuits include B+ or positive direct current supply voltage lines 118, 118a and grounded conductors 119 and 119a.

The 45-megacycle control voltage and the 30-megacycle difference voltage output of the combining and delay circuit 85 are impressed on the control member 120 of a pentode type electric discharge devices 121 by conductor 92. The anode of the device 121 is connected to the plate supply 118 through a plate resistor 122 and the cathode is connected to ground conductor 119 through a biasing circuit including parallel connected resistor 123 and capacitor 124. Resistor 125 and capacitor 126 are connected in series between supply conductors 118 and 119, and the common point thereof establishes the screen grid potential. Both the 30-megacycle and 45-megacycle outputs of the discharge device 121 are impressed on conductor 94 by means of a circuit including capacitor 127, inductance 128 and inductance 129 connected in series between the plate of discharge device 121 and the ground conductor 119. The stray capacitance of the output circuit is shown by the dotted capacitor 130 connected between the output conductor 94 and ground conductor 119. The inductance 129 is made resonant with the stray capacitance indicated by capacitance 130 at 45 megacycles. At 30 megacycles, inductance 129 and the stray capacitance 130 appear inductive, and in combination with inductance 128 are made series resonant with the capacitor 127. The output circuit conductor 94 connected to the common point of inductances 128 and 129 is effective to transfer both the 30- and 45-megacycle output voltages.

The conductor 94 is coupled to the control electrode 131 of an amplifier valve 132 to impress thereon both 30- and 45-megacycle voltages through a suitable coupling capacitor 133. Both 30- and 45-megacycle voltages are also impressed on the input electrode 134 of an electric discharge device 135 through conductor 94a. Both discharge devices 132 and 135 are connected in conventional amplifier circuits as far as their input and plate circuits are concerned. The outputs, however, are tuned respectively to 30 megacycles and 45 megacycles. Referring now particularly to the circuit of discharge device 132, the output conductor 93a is connected to the ground conductor 119 through a resonant output circuit including an inductance 136 in series with a parallel connected inductance 137 and adjustable capacitor 138. Inductance 137 and capacitance 138 are resonant at 30 megacycles so that this voltage appears efficiently between the conductor 93a and the ground conductor 119. At 45 megacycles, the combination of inductance 137 and capacitor 138 appears capacitive and together with inductance 136 is series resonant thereby providing a low impedance filter which effectively eliminates the 45-megacycle voltage from the output conductor 93a.

In a similar manner, the output circuit of the discharge device 135 is designed to selectively impress an amplified 45-megacycle voltage on output conductor 140 connected to the plate of discharge device 135 through a suitable coupling or isolating capacitor 141. The output circuit includes an inductance 142 connected in series with the parallel connected inductance 143 and adjustable capacitor 144 and between the output conductor 140 and ground conductor 119a. Also shown in parallel with this circuit combination is a capacitor 145 in dotted lines and representing the stray capacitance associated with the circuit.

This circuit is effective to selectively impress the amplified 45-megacycle voltage on output conductor 140, as will be apparent from the following considerations. Inductance 143 and capacitor 144 resonate below 30 megacycles so that this combination appears capacitive at 30 megacycles and is made to be series resonant with the inductance 142. It thus provides a low impedance to ground at 30 megacycles. The total circuit including inductances 142 and 143, together with capacitor 144 and stray capacitance 145, is parallel resonant at 45 megacycles and is thus effective to impress a 45-megacycle amplified output on conductor 140.

This voltage is detected by a two-stage envelope detector including in series two diodes 147 and 148 poled to conduct current in the direction of the arrows and capacitors 148 and 149 connected respectively between the positive terminals of the diodes and the ground conductor 119a to impress a voltage on the conductor 96 which becomes more negative with respect to the ground conductor 119a when the amplitude of the amplified 45-megacycle voltage increases. This voltage is impressed on the control member 150 of electric discharge device 151 which has been designated as a video coupling stage on the schematic diagram of FIG. 4. The control member circuit is completed by resistor 152 connected between the control member 150 and the grounded conductor 119a. The anode of device 151 is connected to the plate supply 118a through a resistor 153. The cathode is connected to a source of reference direct current voltage negative with respect to the grounded conductor 119a through a resistor 154. The common point between the cathode resistor 154 and the cathode of the device 151 is connected to the suppressor grid 155 of discharge device 121 through conductor 98. As is well understood, this suppressor grid 155 may operate as a second control grid and this circuit is used to control the gain of the discharge device 121 inversely in accordance with the magnitude of the amplified 45-megacycle voltage.

By proper adjustment of the direct current reference voltage connected with resistor 154, it is possible to reduce the gain of the amplifier valve 121 by an amount which will tend to maintain the 45-megacycle output of valve 121 constant regardless of variations in the input. Since the 45-megacycle voltage is influenced by target range and size in the same manner as the 30-megacycle difference voltage, it will be apparent that this control also renders the 30-megacycle output of discharge device 121, and as a result the 30-megacycle voltage output of conductor 93a, independent of target range and size.

Since a certain amount of delay is involved in getting the amplified and detected 45-megacycle voltage back on the suppressor grid 155 of discharge device 121, it is necessary to introduce a corresponding delay in the 30-megacycle voltage impressed on the control member 120 of discharge device 121. It is for this purpose that the delay network 104 is employed in the combining and delay circuit of FIG. 5. It will be appreciated that the magnitude of the delay introduced is just equal to the delay resulting from the transfer of the 45-megacycle voltage around the loop from conductor 94 through the circuits of discharge devices 135 and 151 and back to the suppressor grid 155 of discharge device 121.

In FIG. 7, I have shown a range multiplier circuit which may be used as the circuit shown schematically at 100 in FIG. 4. This circuit will now be described in detail before proceeding to a description of the operation of FIG. 4. The range multiplier circuit includes a plate supply conductor 160 and a grounded conductor 161. A pair of electric valves of matched characteristics 162 and 163 are connected between conductors 160 and 161 through plate resistors 164 and 165, respectively. The cathodes are connected together and to the grounded conductor 161 through a biasing circuit including parallel connected resistor 166 and capacitor 167. The discharge devices 162 and 163 are suppressor grid tubes, and the suppressor grids 162a and 163a are both energized from the output of the range sweep generated by conductor 168 which impresses a sawtooth voltage on these grids which increases linearly with time and is a measure of radar range. The anodes of the discharge devices 162 and 163 are thus equally affected by this suppressor grid voltage so that the output transformer 169 connected therebetween impresses no voltage on the output conductors 170 due to the presence of this sawtooth voltage on the suppressor grids. This voltage does, however, increse the gain of both devices 152 and 163 linearly with range.

The quantitative error signal output of the phase detector 99 of FIG. 4 is impressed on the control members 171 and 172 of discharge devices 162 and 163 by means of a phase inverter tube 173. This tube has the anode thereof connected to the plate supply conductor 160 through plate resistor 174 and the cathode thereof connected to grounded conductor 161 through resistor 175. The output of the phase detector is impressed directly on the control member 176 of the discharge device 173 through conductor 177. The control grid 171 of discharge device 162 is coupled to the midpoint of a voltage dividing circuit including capacitor 178 and resistor 179 connected between the anode of discharge device 173 and ground conductor 161. The control grid 172 of discharge device 163 is connected to the midpoint of a voltage dividing circuit including capacitor 185 and resistor 181 connected in series between the cathode of device 173 and grounded conductor 161. With these circuit connections, it is apparent that a more positive voltage is impressed on the control member 171 when a more negative voltage is impressed on control member 172 and vice verse. Accordingly, the voltage difference impressed on the output transformer 169 is dependent on the magnitude and instantaneous polarity of the input voltage. Since the gains of both tubes 162 and 163 are modified in accordance with the sawtooth range voltage, it is clear that the output voltage of conductor 170 is a function of the video error voltage multiplied by the target range.

The operation of the system of FIG. 4 as a whole will now be described. High frequency energy radiated by the antennas 50 and 51 in the form of pulses is reflected by any target within the field of the antennas and received by the antennas 50 and 51. When the target is on the equisignal or equiamplitude axis of the antenna assembly, the output of the intermediate frequency difference amplifier 88 is essentially zero and the display on the face of the cathode ray tube device 55 is determined by the voltage at control grid 57 produced by the output of the sum channel 75 and the deflection caused by the coils 62 and 63 carried on the rotatable yoke 64, which as pointed out earlier in the specification is rotated in accordance with the position of the antenna assembly in azimuth by a servo system. Thus, for a target on the equiamplitude axis of the antenna assembly, the display is simply a radial line having an angular position corresponding to the direction of the antenna axis and a bright spot caused by the control afforded by the sum channel on the control member 57 at a range (radial position) corresponding to the range of the target.

If the target is not on the equisignal or equiamplitude axis of the antenna assembly, the present invention provides for the production of a quantitative error voltage which is applied to correct the deflection of the cathode ray tube device 55 to show the target at its true position. This is accomplished in the difference channel 76. As previously pointed out in connection with the description of the various components, the difference between the output voltages of the intermediate frequency amplifier 79 and 80 is obtained in a combining circuit 85, and this voltage is added to a 45-megacycle voltage obtained from the mixer 89 from the sum intermediate amplifier 82. The 45-megacycle voltage is used to control the gain of the difference intermediate frequency amplifier 88 by a feedback circuit, the output of which is impressed on the suppressor grid of that amplifier as described in detail in connection with FIG. 6. Since the sum voltage varies in amplitude with range and target size, it is apparent that if the gain of the difference intermediate frequency amplifier 88 is controlled to maintain the 45-megacycle voltage substantially constant, it will at the same time render the difference 30-megacycle voltage independent of range and target size. This control of the gain of amplifier 88 is accomplished by the amplifier and detector circuit 95 and the video coupling stage 97 as described in detail in connection with FIG. 6.

The output voltage of amplifier 93 is impressed on the phase detector 98a through conductor 93a and compared with an intermediate frequency reference voltage obtained from the amplifier 83 of the sum channel and reduced to constant amplitude by the clipper amplifier 99. This voltage provides a reference with which the difference voltage is compared in the phase detector for the purpose of producing a voltage having an amplitude which varies with the magnitude of the deviation of the target from the equisignal axis of the antenna assembly and reverses in sign as the direction of the deviation changes from one side of the axis to the other.

Since the actual deflection in azimuth required in a circumferential direction is directly proportional to range, it is necessary to multiply this video error voltage by a range multiplier circuit which was described in detail in connection with FIG. 7. This voltage is applied through power amplifier 101 to the slip rings 72 and 73 which in turn energize the windings 70 and 71 to deflect the beam at the time of a hit in a circumferential direction just enough to show the hit a true azimuth position. Referring particularly to FIG. 4a, assuming that the azimuth position of the antenna assembly is represented by the radial display 1, $m$ while the target is at an azimuth position corresponding to the line 1, $n$, the error voltage is then sufficient to deflect the beam at the time of the hit from the line 1, $m$ to the line 1, $n$ as shown at O. If the target is stationary and the antenna rotates in a direction to bring the normal display along the line 1, $n$, the deviation between the target position and the equisignal axis of the antenna assembly decreases and the video error voltage decreases until the point O falls on the normal display at the time that the display has moved to a position 1, $n$.

In FIG. 8, I have shown a modification of my invention in a system of the phase comparison type in which the error voltage is used directly for display purposes rather than as a correction deflection voltage. I have also illustrated a circuit arrangement for combining the antenna voltages at the radio frequency level rather than at the intermediate frequency level.

The display tube is of the electrostatic type and may be of exactly the same construction as shown in connection with FIG. 3, and corresponding parts have been designated by the same reference numerals. The transmitter may be also a conventional pulse transmitter and include a transmitter unit 185 and a pulse modulator 186. The antenna array is of a type suitable, for example, for use in connection with a tracking radar system and is provided with four antenna feeds designated $a$, $b$, $c$ and $d$. Feeds $a$ and $b$ lie above the axis of rotation of the antenna system in elevation, and the feeds $c$ and $d$ lie below that axis. Similarly, feeds $a$ and $c$ lie on one side of the axis of the rotation of the antenna in azimuth, and the feeds $b$, $d$ lie on the other side.

The manner in which the antenna assembly is positioned automatically to follow a target forms no part of the present invention, and the antenna drive and servo system for this control is designated schematically as including suitable azimuth and elevation drive and control systems designated by the numerals 188 and 189.

The output of the pulse transmitter 185 is supplied to the four antenna feeds $a$, $b$, $c$, $d$ through separate waveguide circuits 190–193, inclusive, including individual ATR (anti transmit receive) devices 194. The received radio frequency voltage pulses are transmitted through four individual waveguide systems 195, 196, 197 and 198, each including in series a suitable TR (transmit receive device 199). The voltages of the four waveguide systems 195–198, inclusive, are combined to give a sum voltage, an elevation difference voltage, and an azimuth difference voltage by suitably connected hybrid junctions or magic T connections 200, 201, 202 and 203.

Referring now to FIG. 9, I have shown an enlarged view of one of these hybrid junctions 200 showing the four arms $e$, $f$, $g$ and $h$. As will be understood by those skilled in the art, high frequency voltages impressed on the opposed arms such as $e$ and $f$ will be added at the output of one of the remaining arms, namely, the arm $g$, and subtracted at the output of the other arm $h$. This characteristic of the magic T renders it very suitable for obtaining the sum and difference voltages desired in the system of FIG. 8. Referring again to FIG. 8, the junction 200 has the arms $e$ and $f$ connected with waveguide feeds 204 and 205 from antennas $a$ and $b$, and the sum of these two voltages designated $(e_a + e_b)$ is impressed on waveguide 206 connected to the sum arm $g$ of the junction. Likewise, the voltage from antennas $c$–$d$ is impressed on arms $e$ and $f$ of junction 201 by waveguides 207 and 208, and the voltage $e_c + e_b$ appears at the sum arm $g$. These two sum voltages are impressed on the arms $e$ and $f$, respectively, of the junction 202 by waveguides 206 and 209 so that a voltage representing the sum of the voltages received by feeds $a$, $b$, $c$ and $d$ appears at the sum arm $h$ of junction 202. As designated, this equals $e_r$ which is the sum voltage or range information voltage of the system. In a similar manner, the voltage at the difference arm $h$ of junction 200 represents $e_a - e_b$ and at the difference arm of junction 201 represents the voltage $e_c - e_d$. Since the antennas $a$ and $b$ are above the axis of rotation of the antenna assembly in elevation and $c$ and $d$ are below it, the elevation difference voltage is $(e_a + e_b) - (e_c + e_d)$.

This is the voltage appearing at the difference arm $h$ of junction 202. In a similar manner, the azimuth difference voltage is $(e_a+e_c)-(e_b+e_d)$; the sum of the voltages received on one side of the axis of rotation in azimuth minus the sum of voltages received on the other side of the axis of rotation in azimuth. This voltage is obtained by adding together the output of the difference arms $h$ of junctions 200 and 201. Accordingly, this output appears at the sum arm $g$ of junction 203. The difference output of this junction is not employed, and so the difference arm is terminated by a suitable matching load indicated schematically by the resistor 210.

From the above description, it is apparent that the sum of the four received voltages appears on the waveguide 211 connected with the sum arm $g$ of junction 202. The elevation difference voltage appears on waveguide 212 connected with the difference arm $h$ of junction 202, and the azimuth difference voltage appears on the waveguide 213 connected with the difference arm $h$ of junction 203. These voltages are supplied to separate receiver channels designated generally by the numerals 214, 215, 216.

As will be appreciated by those skilled in the art, the difference voltages impressed on waveguides 212 and 213 are 90 degrees out of phase with the sum voltage impressed on waveguide 211 of the sum channel and may either lead or lag the sum voltage by 90 degrees dependent upon the direction of deviation in elevation and azimuth. The magnitudes of the deviations in elevation and azimuth determine the magnitudes of the difference voltages. Since the directional information from the antenna system is, after combination in the hybrid junctions, preserved in the magnitude and direction (sign) of the difference voltages impressed on the waveguides 212 and 213 of the difference channels 215 and 216, these channels are very similar to the difference channel of the amplitude comparison system of FIG. 4.

Each receiver channel includes a mixer circuit designated by the numeral 217 and an intermediate frequency amplifier designated by the numeral 218. The high frequency voltages are supplied to the mixer circuits 217 and combined with the output of a local oscillator 219 to produce intermediate frequencies which are impressed respectively on the intermediate frequency amplifiers 218 of the range channel 214, the elevation channel 215, and the azimuth channel 216. The output voltages of these intermediate frequency amplifiers are controlled in essentially the same manner as described in connection with FIG. 4 and will be very briefly described here.

The range voltage output of the intermediate frequency amplifier of channel 214 is supplied to a further amplifier 219 and an amplifier and amplitude detector 220, the output of which is impressed on the control grid 35 of the cathode ray device 1.

The output of the intermediate frequency amplifier 218 of the elevation channel is combined in a combining and delay circuit 222 with the output of a mixer circuit 223 energized from a local oscillator 224 and the sum intermediate frequency amplifier 218 of the range channel 214. As was described in connection with FIG. 4, the local oscillator 224 and mixer 223 are for the purpose of obtaining a control voltage having a different frequency than the output of intermediate frequency amplifier 218 which is used to control the gain of instantaneous control amplifier 226 inversely with respect to the amplitude of the control voltage and in this way to render both the control voltage output and the elevation difference voltage output of the amplifier 226 independent of range and target size. It will be readily appreciated that the azimuth intermediate frequency difference voltage is controlled in the same manner by combining and delay circuit 227 and instantaneous control amplifier 228.

The output of instantaneous control amplifier 226 is supplied to an elevation phase detector 229 where it is compared with an intermediate frequency voltage of constant amplitude obtained from the sum amplifier 219 at the sum channel 214 by means of a clipper amplifier 230. The output of the elevation phase detector is supplied through a suitable elevation amplifier 231 to the vertical deflection plates (elevation) 20 and 21 of the cathode ray device 1. In a similar manner, the output of the azimuth phase detector 232 is supplied through a suitable azimuth amplifier 233 to the horizontal deflection plates 43 and 44.

It is believed that the operation of the foregoing modification of the invention is clear from the detailed description of the components particularly in view of the earlier description of operation of FIG. 4. It will be apparent that the quantitative error voltage produced by this modification for both elevation and azimuth is used directly as a deflection voltage rather than a correction deflection voltage. Assuming that the antenna system is stationary and that a target has some position in azimuth and elevation other than on the equisignal axis of the array, deflection voltages will be obtained which will show the position of the target with respect to the antenna position on the face of the cathode ray tube shown in FIG. 9a. If the antenna is locked on to a target by means of a tracking radar system, then the deflections may show the positions of other targets relative to the one which the antenna is following. The system in this manner can be applied as an indicator of the position of projectiles relative to a target being tracked.

It is also apparent that range, elevation and azimuth information for tracking purposes is available at the output of detectors 220, 230 and 232, respectively, and connections 234, 235 and 236 have been shown for this purpose.

From the foregoing description of a number of modifications of my invention, it is apparent that it involves the idea of producing a quantitative error voltage which is independent of range and target size and may be used for display or other purposes. It is also apparent that the voltages from a multiple antenna system, which may be of either the phase comparison or amplitude comparison type, may be combined at either the radio frequency or intermediate frequency levels.

While specific embodiments have been shown and described, it will, of course, be understood that various modifications may be made without departing from the invention. The appended claims are therefore intended to cover any such modifications within the true spirit and scope of the invention.

What I claim as new and desire to secure by Letters Patent of the United States is:

1. Object locating apparatus for determining the position of a remote reflecting object comprising a pair of directive antennas having an equisignal axis so that electrical signals received from a remote object have a given characteristic of equal magnitude when the object is on said equisignal axis, means mounting said antennas for rotation about an axis substantially perpendicular to said equisignal axis, means responsive to the angular position of said antenna on its axis of rotation for producing a voltage indicative of the direction of the equisignal axis of said antennas, additional means responsive to the algebraic difference in said characteristic of the signals received by said antennas for producing an error voltage having a magnitude and sign dependent upon the magnitude and direction of the deviation of the object from said equisignal axis, and means for combining said voltage and said error voltage to provide a corrected indication of the direction of the reflecting object.

2. Object locating apparatus for determining the position of a remote reflecting object comprising a pair of directive antennas having an equisignal axis so that electrical signals received from a remote object have a given characteristic of equal magnitude when the object is on said equisignal axis, means mounting said antennas for rotation about an axis substantially perpendicular to said equisignal axis, a cathode ray tube device, means responsive to the angular position of said antenna on its axis of rotation for deflecting the beam of said cathode ray tube device to a position corresponding to the direction of said equisignal axis of said antennas, additional means responsive to the algebraic difference in said characteristic of the signals received by said antennas for producing an error voltage having a magnitude and sign dependent upon the magnitude and direction of the deviation of the object from said equisignal axis and independent of target size, and means deflecting the beam of said cathode ray tube device in accordance with said error voltage to provide a corrected indication of the direction of the reflecting object.

3. Object locating apparatus for determining the position of a remote reflecting object comprising a pair of directive antennas having an equisignal axis so that electrical signals received from a remote object have a given characteristic of equal magnitude when the object is on said equisignal axis, means mounting said antennas for rotation about an axis substantially perpendicular to said equisignal axis, a cathode ray tube device, means responsive to the angular position of said antenna on its axis of rotation for deflecting the beam of said device along one coordinate to a position indicating the direction of the equisignal axis of said antennas, means responsive to the algebraic difference in said characteristic of the signals received by said antennas for producing an error voltage having a magnitude and sign dependent upon the magnitude and direction of the deviation of the object from said equisignal axis and independent of target size, and means deflecting the beam of said cathode ray tube device along said coordinate in accordance with said error voltage to provide a corrected indication of the direction of the reflecting object.

4. In a monopulse radar system for receiving high frequency pulses reflected from a target, the combination comprising a directive antenna assembly having two antennas spaced apart in a given plane on opposite sides of an equiphase axis whereby voltages received by said antennas have a relative phase relation dependent upon the deviation of the target from said axis pivoted means coupled to said directive antenna assembly and having an axis of rotation perpendicular to said equiphase axis, a pair of receiver channels energized respectively from said antennas, a cathode ray tube device, means independent of said receiver channels for deflecting the beam of said device in accordance with the angular position of said antenna assembly about its axis of rotation and means responsive to the phase difference of the voltages impressed on said receiver channels for impressing a corrective deflection voltage on said deflecting means which is independent of target size and proportional to the deviation between the equiphase axis of said antenna assembly and the target to deflect the beam to a position corresponding to the true target position.

5. In a monopulse radar system for receiving high frequency pulses reflected from a target, the combination comprising a directive antenna assembly having two antennas spaced apart in a given plane on opposite sides of an equiphase axis whereby voltages received by said antennas have a relative phase relation dependent upon the deviation of the target from said axis, a pair of receiver channels energized respectively from said antennas, phase detecting means responsive to the phase difference between the voltages impressed on said receiver channels and voltage clipping means for producing a quantitative error voltage having a magnitude independent of target size and proportional to the deviation between the axis of symmetry of the antenna and the target and a sign dependent upon the direction of the deviation with respect to said axis.

6. In a monopulse radar system for receiving high frequency pulses reflected from a target, the combination comprising a directive antenna assembly having two antennas spaced apart in a given plane on opposite sides of an equiphase axis, whereby voltages received by said antennas have a relative phase relationship dependent upon the deviation of the target from said axis, a pair of receiver channels energized respectively from said antennas and including means for producing two intermediate frequency voltages having the same relative phase relation as the high frequency voltages impressed on said receiver channels, clipper circuits for rendering the magnitude of said intermediate frequency voltages independent of target size and range, a phase detector energized from the output of said clipper circuits to produce a video error signal having a magnitude quantitatively proportional to the deviation of the target from the axis of symmetry of the antenna assembly.

7. In a monopulse radar system for receiving high frequency pulses reflected from a target, the combination comprising a directive antenna assembly having two antennas supported to receive reflected electrical signal voltages, said signals having a given characteristic of equal magnitude when the target is on the equisignal axis of said antenna assembly whereby the difference between said characteristic of said signals varies in magnitude with variations in deviation of the target position with respect to said axis and reverses in sign as the direction of the deviation from said axis reverses, a receiver channel energized by a difference voltage dependent upon the difference in said characteristic of the voltages received by sad antennas, means for rendering the magnitude of said difference voltage independent of range and target size, and circuit means energized from the output of said last mentioned means to produce a video error signal having a magnitude quantitatively proportional to the deviation of the target from the equisignal axis of the antenna assembly and a sign dependent upon the direction of the deviation.

8. In a monopulse radar system for receiving high frequency pulses reflected from a target, the combination comprising a directive antenna assembly having two antennas spaced apart in a given plane on opposite sides of an equiphase axis whereby voltages received by said antennas have a relative phase relationship dependent upon the deviation of the target from said axis, a pair of receiver channels energized respectively from said antennas and including means for producing two intermediate frequency voltages having the same relative phase relation as the high frequency voltages impressed on said receiver channels, clipper circuits for rendering the magnitudes of said intermediate frequncy voltages independent of target size and range, a phase detector energized from the outputs of said clipper circuits to produce a video error signal having a magnitude quantitatively proportional to the deviation of the target from said axis of the antenna assembly, a cathode ray device for indicating the position of the reflecting target, means mounting the antenna assembly for rotation about an axis perpendicular to said equiphase axis, means for supplying a voltage to said cathode ray device to deflect the beam in accordance with the angular position of said antenna assembly and means for impressing said video error signal on said cathode ray device to deflect the beam to a position indicating true target position when the target is not on the equiphase axis.

9. In a monopulse radar system for receiving high frequency pulses reflected from a target, the combination comprising a directive antenna assembly having two antennas spaced apart in a given plane on opposite sides of an equisignal axis whereby voltages received by said antennas have a characteristic the magnitude of which is dependent upon the deviation of the target from said axis, a pair of receiver channels energized respectively from said antennas and including means for producing two intermediate frequency voltages having the same relative magnitudes of said characteristic as the high frequency voltages impressed on said receiver channels, clipper circuits for rendering the magnitude of said intermediate frequency voltages independent of target size and range, a phase detector energized from the outputs of said clipper circuits to produce a video error signal having a magnitude quantitatively proportional to the deviation of the target from said axis of the antenna assembly, a cathode ray device for indicating the position of a reflecting target, means mounting the antenna assembly for rotation about an axis perpendicular to said equisignal axis, means for supplying a voltage to said cathode ray device to deflect the beam in accordance with the angular position of said antenna assembly and means for impressing said video error signal on said cathode ray device to deflect the beam to a position indicating true target position when the target is not on the equisignal axis.

10. In a monopulse radar system for receiving high frequency pulses reflected from a target, the combination comprising a directive antenna assembly having two antennas supported to receive reflected electrical signal voltages having a given characteristic of equal magnitude when the target is on the equisignal axis of said antenna assembly whereby the difference between said characteristic of said signal voltages varies in magnitude with variations in the deviation of the target position with respect to said axis and reverses in sign as the direction of the deviation from said axis reverses, a pair of receiver channels energized respectively from said antennas and including means for producing two intermediate frequency voltages having the same relative values of said characteristic as the high frequency signals impressed on said receiver channels, means for obtaining the difference of the intermediate frequency voltages, means for rendering the magnitude of said difference of said intermediate frequency voltage independent of range and target size, and a phase detector energized from the output of said last mentioned means to produce a video error signal having a magnitude quantitatively proportional to the deviation of the target from the equisignal axis of the antenna assembly and a sign dependent upon the direction of the deviation.

11. In combination, a pair of wave energy antennas arranged to provide a pair of output waves, in response to wave energy from a remote location, having a given characteristic and related to one another in accordance with the angular deviation of said remote location with respect to a common direction axis for said antennas, an indicator responsive to said output waves for producing an indication representing an approximation of the angular position of said remote location, means responsive to said output waves for deriving an error potential having a magnitude and sign dependent upon said angular deviation, and means for utilizing said error potential to correct said indication and provide a more precise representation of the angular position of said remote location on said indicator.

12. In combination, a pair of wave energy antennas arranged to provide a pair of output waves, in response to wave energy from a remote location, having a given characteristic and related to one another in accordance with the angular deviation of said remote location with respect to a common direction axis for said antennas, an indicator for producing an indication representing the angular position of said direction axis, means responsive to said output waves for deriving an error potential having a magnitude and sign dependent upon said angular diviation, and means for utilizing said error potential to correct said indication and provide a precise representation of the angular position of said remote location on said indicator.

13. In combination, a pair of wave energy antennas arranged to provide a pair of output waves, in response to wave energy from a remote location, having a given characteristic and related to one another in accordance with the angular deviation of said remote location with respect to a common direction axis for said antennas, means responsive to said output waves for deriving a quantity representing an approximation of the angular position of said remote location, means responsive to said output waves for deriving an error potential having a magnitude and sign dependent upon said angular deviation, and means for utilizing said error potential to correct said quantity and provide a more precise representation of the angular position of said remote location.

14. In combination, a plurality of wave energy antennas arranged to provide a plurality of output waves, in response to wave energy from a remote location, having a given characteristic and related to one another in accordance with the angular deviation of said remote location with respect to a common position axis for said antennas, an indicator responsive to said output waves for producing an indication representing an approximation of the angular position in azimuth and elevation of said remote location, means responsive to said output waves for deriving at least one error potential having a magnitude and sign dependent upon said angular deviation, and means for utilizing said error potential to correct said indication and provide a more precise representation of the angular position of said remote location.

15. In combination, four wave energy antennas arranged to provide two pairs of output waves, in response to wave energy from a remote location, having a given characteristic, said characteristic of the output waves in one of said pairs being related to one another in accordance with the angular deviation in azimuth of said remote location with respect to a common direction axis for said antennas and said characteristic of the output waves in the other of said pairs being related to one another in accordance with the angular deviation in elevation of said remote location with respect to said common direction axis, means for producing an indication representing the angular position of said common direction axis, means responsive to said output waves for deriving two error potentials, each having a magnitude and sign dependent upon said one of said angular deviations in azimuth and elevation, and means for utilizing said error potentials to correct said indication and provide a precise representation of the angular position of said remote location.

16. In combination, a pair of wave energy antennas arranged to provide a pair of output waves, in response to wave energy from a remote location, having a given characteristic and related to one another in accordance with the angular deviation in azimuth of said remote location with respect to a common direction axis for said antennas, means for producing an indication representing the angular position of said common direction axis, means responsive to said output waves for deriving an error potential having a magnitude and sign dependent upon said angular deviation, and means for utilizing said error potential to correct said indication and provide a precise representation of the angular position in azimuth of said remote location.

17. In combination, a pair of wave energy antennas arranged to provide a pair of output waves, in response to wave energy from a remote location, having a given characteristic and related to one another in accordance with the angular deviation in elevation of said remote location with respect to a common direction axis for said antennas, means for producing an indication representing the angular position of said common direction axis, means responsive to said output waves for deriving an error potential having a magnitude and sign dependent upon said angular deviation, and means for utilizing said error potential to correct said indication and provide a precise representation of the angular position in elevation of said remote location.

18. In combination, a pair of wave energy antennas arranged to provide a pair of output waves, in response to wave energy from a remote location, having relative amplitudes defining the angular deviation of said remote location with respect to a common direction axis for said antennas, means for producing an indication representing the angular position of said common direction axis, means responsive to said relative amplitudes of said output waves for deriving an error potential having a magnitude and sign dependent upon said angular deviation, and means for utilizing said error potential to correct said indication and provide a precise representation of the angular position of said remote location.

19. In combination, a pair of wave energy antennas arranged to provide a pair of output waves in response to wave energy from a remote location, having relative phases defining the angular deviation of said remote location with respect to a common direction axis for said antennas, means for producing an indication representing the angular position of said common direction axis, means responsive to said relative phases of said output waves for deriving an error potential having a magnitude and sign dependent upon said angular deviation, and means for utilizing said error potential to correct said indication and provide a precise representation of the angular position of said remote location.

20. In combination, a pair of wave energy antennas arranged to provide a pair of output waves, in response to wave energy from a remote location, having a given characteristic and related to one another in accordance with the angular deviation of said remote location with respect to a common direction axis for said antennas, an indicator having a viewing screen, having means for producing an indication on said screen and having a deflection system for displacing said indication, means operable on said deflection system for displacing said indication on said viewing screen of said indicator to a position representing the angular position of said common direction axis, means responsive to said output waves for deriving an error potential having a magnitude and sign dependent upon said angular deviation, and means for applying said error potential to said deflection system of said indicator further to displace said indication and provide a precise representation of the angular position of said remote location.

21. In combination, a pair of wave energy antennas arranged to provide a pair of output waves, in response to wave energy from a remote location, having a given characteristic and related to one another in accordance with the angular deviation of said remote location with respect to a common direction axis for said antennas, means for producing an indication representing the angular position of said common direction axis, means responsive to said output waves for deriving a pair of undulating potentials having a phasing with respect to one another of a polarity and an amount dependent upon the polarity and magnitude of said angular deviation, a phase detector coupled to said last-mentioned means and responsive to said pair of undulating potentials for deriving an error potential having a magnitude and sign representing said angular deviation, and means for utilizing said error potential to correct said indication and provide a precise representation of the angular position of said remote location.

22. In combination, a pair of wave energy antennas arranged to provide a pair of output waves, in response to wave energy from a remote location, having a given characteristic and related to one another in accordance with the angular deviation of said remote location with respect to a common direction axis for said antennas, means for producing an indication representing the angular position of said common direction axis, means responsive to said output waves for deriving a pair of undulating potentials having a phasing with respect to one another of a polarity and an amount dependent upon said angular deviation, amplitude limiting means coupled to said last-mentioned means for limiting the amplitude of said pair of undulating potentials to a preselected value while preserving said polarity and said amount of the phasing therebetween, a phase detector coupled to said amplitude limiting means and responsive to said pair of undulating potentials translated thereby for deriving an error potential having a magnitude and sign representing said angular deviation, and means for utilizing said error potential to correct said indication and provide a precise representation of the angular position of said remote location.

23. In a simultaneous lobing radar system having a transmitter for transmitting signals, two antennas having energy patterns with a central axis for receiving signals echoed from an object, a common scan drive for said antennas, two transmission lines connected to said antennas and interconnected to provide the vector sum of signals from said antennas at a connection to one line and the vector difference of signals at a connection to the other line, a phase detector connected to said connections to derive an output with sensing proportional to the difference signal amplitude and phase, said output thereby affording a correction voltage substantially proportional to the angular departure of the echoing object from said central axis, indicator means connected to said antenna drive and having an indication along one coordinate responsive to the antenna position of said antennas to indicate the angular direction of said central axis, said indicator means also being connected to receive and the said indicated position being responsive along the same said one coordinate both in sense and amplitude to said output, whereby the indicated position is compensated for the said angular departure of the central axis from the echoing object.

References Cited by the Examiner

UNITED STATES PATENTS

| | | | |
|---|---|---|---|
| 1,562,485 | 11/1925 | Affel | 343—105 |
| 2,456,666 | 12/1948 | Agate et al. | 343—113 |
| 2,467,361 | 4/1949 | Blewett | 172—245 |
| 2,509,207 | 5/1950 | Busignies | 343—113 |
| 2,553,294 | 5/1951 | Blewett | 343—11 |
| 2,736,019 | 2/1956 | Vogeley et al. | |
| 2,948,892 | 8/1960 | White | 343—113 X |

RODNEY D. BENNETT, *Primary Examiner.*

NORMAN H. EVANS, CHESTER L. JUSTUS,
*Examiners,*

R. E. BERGER, *Assistant Examiner.*